US011143032B2

(12) United States Patent
Eastwood et al.

(10) Patent No.: US 11,143,032 B2
(45) Date of Patent: Oct. 12, 2021

(54) TURBINE ROTOR LOCKING ASSEMBLY AND METHOD

(71) Applicant: United Technologies Corporation, Farmington, CT (US)

(72) Inventors: Jonathan Jeffery Eastwood, West Hartford, CT (US); Christopher M. Juh, Hobe Sound, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 152 days.

(21) Appl. No.: 16/173,644

(22) Filed: Oct. 29, 2018

(65) Prior Publication Data

US 2020/0131909 A1 Apr. 30, 2020

(51) Int. Cl.
*F01D 5/02* (2006.01)
*F16B 31/02* (2006.01)
*F16B 39/28* (2006.01)

(52) U.S. Cl.
CPC ........ *F01D 5/025* (2013.01); *F05D 2220/329* (2013.01); *F05D 2240/60* (2013.01); *F05D 2260/30* (2013.01); *F16B 31/02* (2013.01); *F16B 39/28* (2013.01)

(58) Field of Classification Search
CPC .......... F01D 5/025; F16D 1/06; F16D 1/0805; F16B 31/02; F16B 39/28; F05D 2220/329; F05D 2240/60; F05D 2260/30; B25B 27/14; B25B 23/0085
See application file for complete search history.

(56) References Cited

U.S. PATENT DOCUMENTS

| | | | |
|---|---|---|---|
| 3,449,926 A | 6/1969 | Hawkins | |
| 3,602,535 A | 8/1971 | Behning et al. | |
| 4,969,805 A | 11/1990 | Romeo | |
| 7,661,928 B2 | 2/2010 | Bart et al. | |
| 9,371,863 B2 | 6/2016 | Juh et al. | |
| 9,694,482 B2 * | 7/2017 | Thomas | .................. F16C 35/00 |
| 9,869,198 B2 | 1/2018 | Wotzak | |

OTHER PUBLICATIONS

European Search Report for Application No. 19192279.8 dated Mar. 5, 2020.

* cited by examiner

*Primary Examiner* — David E Sosnowski
*Assistant Examiner* — Sabbir Hasan
(74) *Attorney, Agent, or Firm* — Cantor Colburn LLP

(57) ABSTRACT

A power turbine rotor locking assembly including a rotor shaft. The assembly also includes an aft rotor stage surrounding the rotor shaft. The assembly further includes a locknut torqued to the rotor shaft. The assembly yet further includes a plurality of torque resistance features located on an aft side of the aft rotor stage. The assembly also includes a tooling fixture having a plurality of corresponding torque resistance features, the corresponding torque resistance features selectively engageable with the torque resistance features of the aft rotor stage to resist circumferential movement during assembly and disassembly of the locknut with the rotor shaft.

6 Claims, 4 Drawing Sheets

FIG. 8

# TURBINE ROTOR LOCKING ASSEMBLY AND METHOD

STATEMENT OF FEDERAL SUPPORT

This invention was made with Government support under Contract No. W911W6-16-2-0012 awarded by the United States Army. The Government has certain rights in the invention.

BACKGROUND

Exemplary embodiments pertain to the art of turbine engines and, more particularly, to a turbine rotor locking assembly and method.

Turbine rotors are commonly assembled in multiple stages of blades/vanes. As such, it is common for more than one rotor to be stacked or connected to another prior to being installed onto a turbine shaft. The combination—or stacking—of several different rotor stages is known as a rotor assembly. In order to transfer the rotating torque of the rotor stage to the compressor, gearbox or similar hardware, the rotor assembly is connected to a rotating shaft. The connection includes two important features, specifically a spline, coupling or similar feature which transfers the rotating torque, as well as a locknut which holds the rotor assembly to the shaft.

The purpose of the shaft locknut is to provide an axial preload on the turbine rotor assembly after it is installed on the shaft. Typically the torque on the locknut is very high and will elastically deform the turbine shaft as the nut is tightened. The high axial preload helps keep the turbine rotor assembly tight during operation due to the high torque loads imposed on the interface. As the turbine rotor locknut is tightened and removed, it is necessary to support the turbine shaft in the circumferential direction in order to counteract the rotational force of tightening the locknut. In typical applications, the rotor shaft is held in place as the locknut is tightened by using tabs mounted on the aft face of the rotor shaft. However, in applications with a small diameter turbine shaft, the torque required to tighten the nut during assembly—or loosen the nut during disassembly—is too high. Therefore, the diameter of the axial tabs, combined with their width and thickness, does not provide enough strength to withstand the torque needed to provide the proper shaft nut preload.

BRIEF DESCRIPTION

Disclosed is a power turbine rotor locking assembly including a rotor shaft. The assembly also includes an aft rotor stage surrounding the rotor shaft. The assembly further includes a locknut torqued to the rotor shaft. The assembly yet further includes a plurality of torque resistance features located on an aft side of the aft rotor stage. The assembly also includes a tooling fixture having a plurality of corresponding torque resistance features, the corresponding torque resistance features selectively engageable with the torque resistance features of the aft rotor stage to resist circumferential movement during assembly and disassembly of the locknut with the rotor shaft.

In addition to one or more of the features described above, or as an alternative, further embodiments may include that each of the plurality of torque resistance features of the aft rotor stage is a tab having a first circumferential side and a second circumferential side, wherein each of the corresponding torque resistance features is a slot.

In addition to one or more of the features described above, or as an alternative, further embodiments may include that the number of torque resistance features ranges from two (2) to eight (8).

In addition to one or more of the features described above, or as an alternative, further embodiments may include that the torque resistance features are circumferentially spaced from each other in an equidistant arrangement.

In addition to one or more of the features described above, or as an alternative, further embodiments may include that the torque resistance features are circumferentially spaced from each other in a non-equidistant arrangement.

In addition to one or more of the features described above, or as an alternative, further embodiments may include that the tooling fixture is an annular member having a radially outer surface and a radially inner surface, the radially inner surface defining a central aperture having a diameter greater than a diameter of the locknut and the rotor shaft.

In addition to one or more of the features described above, or as an alternative, further embodiments may include that the corresponding torque resistance features are located proximate the radially outer surface of the tooling fixture.

Also disclosed is a gas turbine engine including a gas generator portion. The engine also includes a power turbine section arranged fluidly downstream from the gas generator portion, the power turbine mechanically disconnected from the gas generator portion. The power turbine section includes a rotor shaft. The power turbine section also includes an aft rotor stage surrounding the rotor shaft, the aft rotor stage defining a circumferential cutout on an aft side of the aft rotor stage, the circumferential cutout at least partially defined by a flange. The power turbine section further includes a locknut torqued to the rotor shaft. The power turbine section yet further includes a plurality of radial tabs extending inwardly from the flange. A tooling fixture has a plurality of slots selectively engageable with the radial tabs of the aft rotor stage to resist circumferential movement during assembly and disassembly of the locknut with the rotor shaft.

In addition to one or more of the features described above, or as an alternative, further embodiments may include that the number of radial tabs ranges from two (2) to eight (8).

In addition to one or more of the features described above, or as an alternative, further embodiments may include that the radial tabs are circumferentially spaced from each other in an equidistant arrangement.

In addition to one or more of the features described above, or as an alternative, further embodiments may include that the radial tabs are circumferentially spaced from each other in a non-equidistant arrangement.

In addition to one or more of the features described above, or as an alternative, further embodiments may include that the tooling fixture is an annular member having a radially outer surface and a radially inner surface, the radially inner surface defining a central aperture having a diameter greater than a diameter of the locknut and the rotor shaft.

In addition to one or more of the features described above, or as an alternative, further embodiments may include that the slots are located proximate the radially outer surface of the tooling fixture.

In addition to one or more of the features described above, or as an alternative, further embodiments may include that the gas turbine engine is located on a helicopter.

Further disclosed is a method of circumferentially locking a turbine rotor of a power turbine. The method includes engaging a plurality of slots of a tooling fixture with a plurality of tabs of an aft side of an aft rotor stage. The method also includes torqueing a locknut to assemble or disassemble the locknut from a rotor shaft of the power turbine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
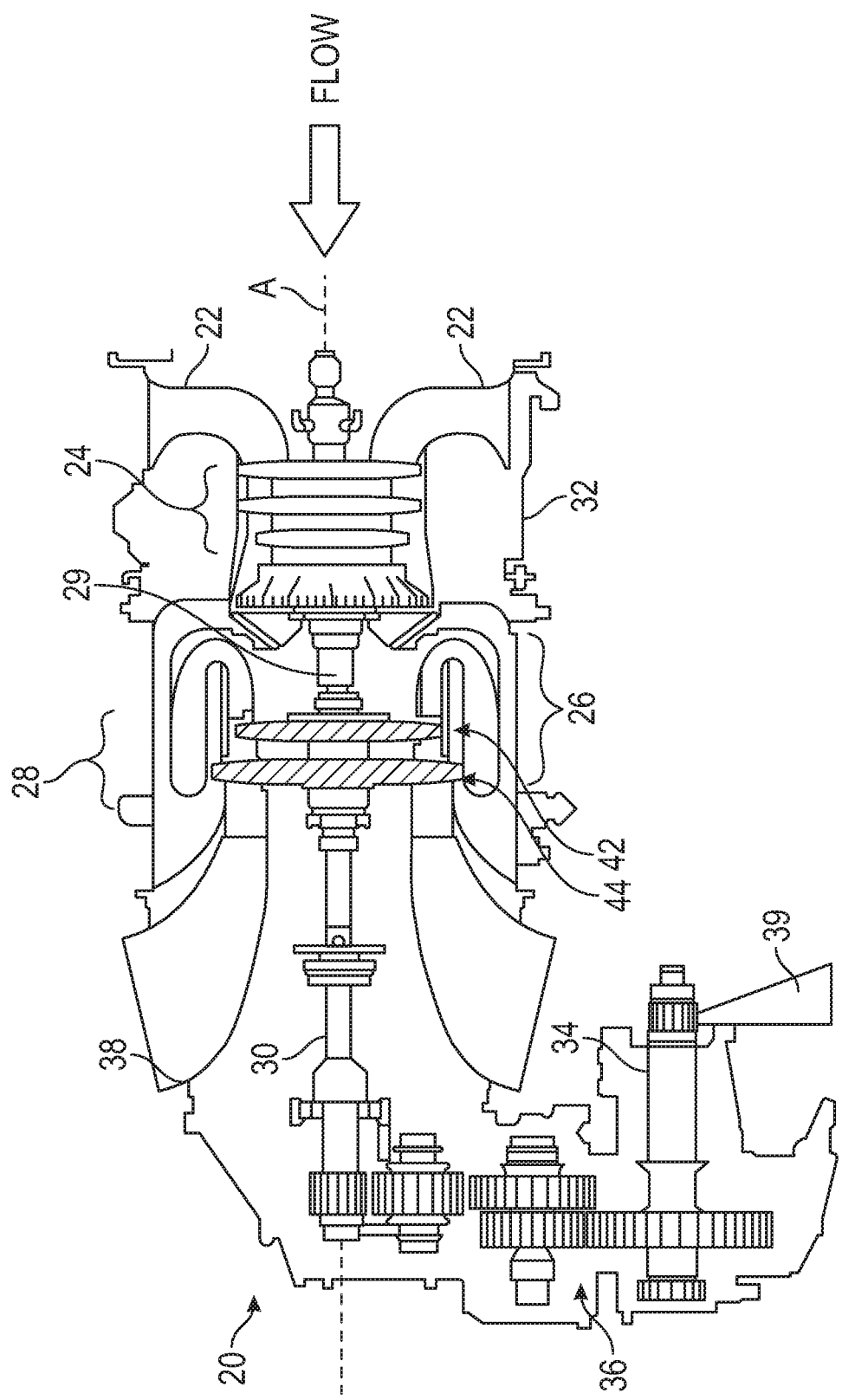
FIG. 1 is a schematic view of a gas turbine engine having a gas generator portion and a power turbine section.

FIG. 1 schematically illustrates a gas turbine engine 20. In the illustrated embodiment, the engine 20 is a turboshaft engine, such as for a helicopter. The engine 20 includes an inlet duct 22, a compressor section 24, a combustor section 26, and a turbine section 28. The compressor section 24 is an axial compressor and includes a plurality of circumferentially-spaced blades. Similarly, the turbine section 28 includes circumferentially-spaced turbine blades. The compressor section 24 and the turbine section 28 are mounted on a main shaft 29 for rotation about an engine central longitudinal axis A relative to an engine static structure 32 via several bearing systems (not shown).

During operation, the compressor section 24 draws air through the inlet duct 22. In this example, the inlet duct 22 opens radially relative to the central longitudinal axis A. The compressor section 24 compresses the air, and the compressed air is then mixed with fuel and burned in the combustor section 26 to form a high pressure, hot gas stream. The hot gas stream is expanded in the turbine section 28, which may include first and second turbine 42, 44.

The first turbine 42 rotationally drives the compressor section 24 via a main shaft 29. Together these components provide a gas generator portion of the engine 20. The second turbine 44, which is a power turbine in the example embodiment, is located aft or downstream of the first turbine 42 and rotationally drives a power shaft 30, gearbox 36, and output shaft 34. Although fluidly coupled to the gas generator portion, the power turbine 44 is mechanically disconnected from the gas generator portion. That is, the main shaft 29 and power shaft 30 are not connected to one another, such that the shafts 29, 30 rotate separately and at different speeds. Moreover, there are no compressors mounted to the power shaft 30. The power turbine 44 can be made up of a single or multiple stages of blades and vanes. The output shaft 34 rotationally drives the helicopter rotor blades 39 used to generate lift for the helicopter. The hot gas stream is expelled through an exhaust 38.

Figure 2:
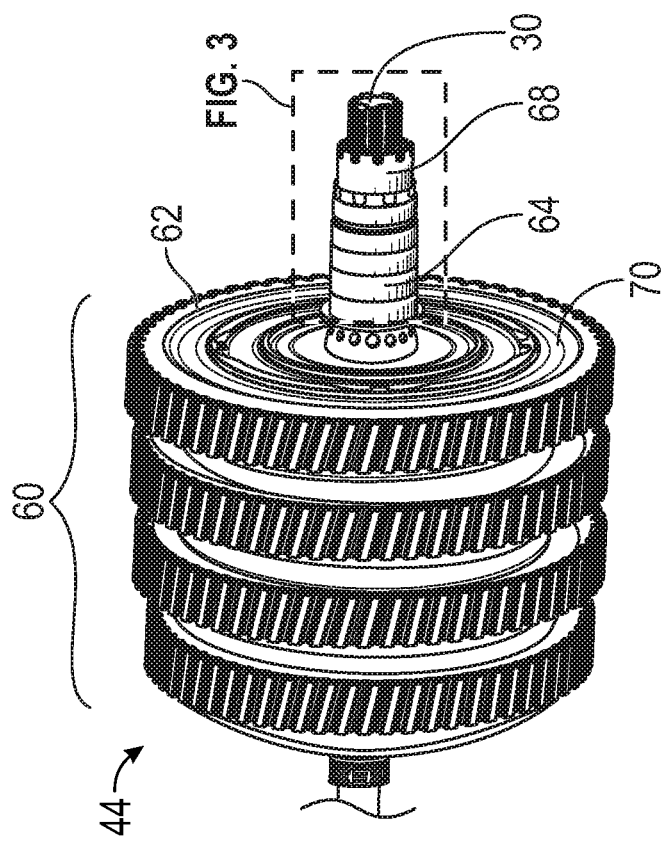
FIG. 2 is a perspective view of rotor stages of the power turbine section.

The power turbine 44 is shown in more detail in FIG. 2. The power turbine 44 includes stages of stator vanes 48 axially spaced apart from one another and supported with respect to the turbine case structure 46, which is part of the engine static structure 32. Stages of rotor blades 50 are axially interspersed between the stages of stator vanes 48.

Figure 3:
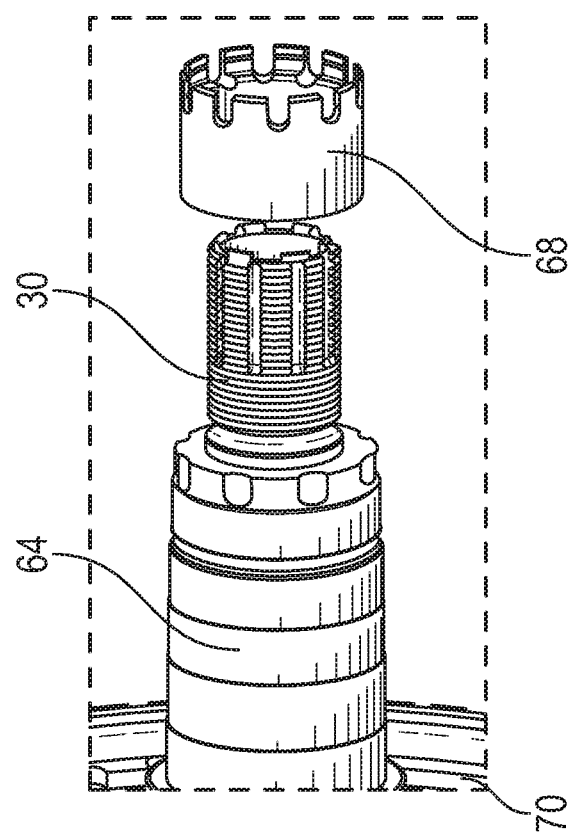
FIG. 3 is an enlarged view of section III of FIG. 2 illustrating a perspective view of a portion of a rotor shaft of the power turbine section and a locknut attachable thereto.

Referring now to FIGS. 2 and 3, a portion of the power turbine 44 is illustrated in greater detail. In particular, aft rotor stages 60 of the power turbine 44, as well as the power shaft 30, are shown. As described above, the power turbine 44 may include one or more rotor stages. In the illustrated embodiment, four aft rotor stages 60 are shown as one example. These may be the only four rotor stages or may be part of a larger number of rotor stages of the power turbine 44. Regardless of the number of rotor stages, each of the aft rotor stages 60 are configured for attachment at a radially outer portion thereof to a plurality of rotor blades.

The rotor stage referenced with numeral 62 is the aft rotor stage and is the rotor stage of the power turbine 44 located further downstream. The aft rotor stage 62 includes a sleeve-like portion 64 that surrounds the power shaft 30. Upon reaching a desired position of the overall power turbine rotor assembly, including the aft rotor stage 62, the axial position of the aft rotor stage 62 is fixed with a locknut 68. A torque is applied to the locknut 68 to apply a high axial preload on the aft rotor stage 62 to keep the overall power turbine rotor assembly tightly fit together. However, the power shaft 30 disclosed herein is significantly smaller in diameter than typical gas turbine engine rotor shafts, such that the torque required to tighten the locknut 68 is too high for the smaller diameter, as the power shaft 30 must counteract the torque required to tighten the locknut 68. For example, in some embodiments, the diameter of the power shaft 30 is as small as 1.0 inch and must withstand an assembly torque of over 1,900 in-lbs. and a disassembly torque of over 3,900 in-lbs.

Figure 5:
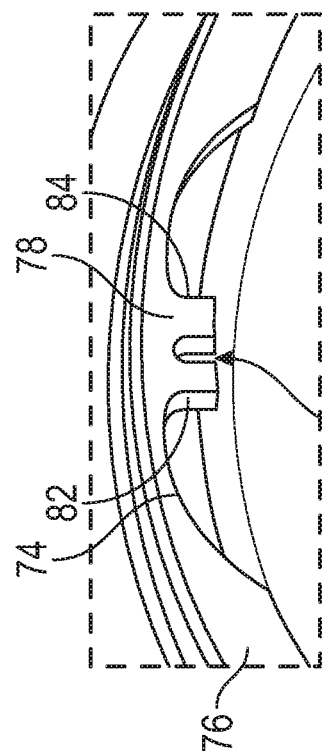
FIG. 5 is a perspective view of a first tab of the aft rotor stage.
Figure 6:
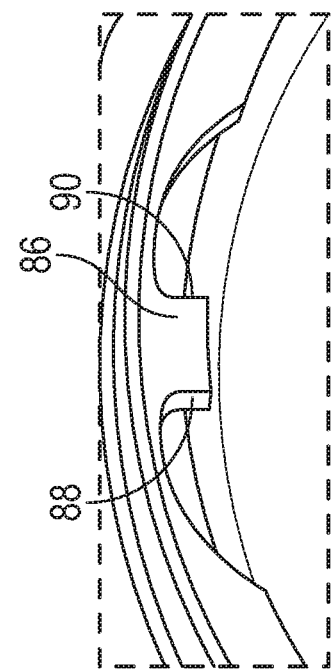
FIG. 6 is a perspective view of a second tab of the aft rotor stage.
Figure 4:
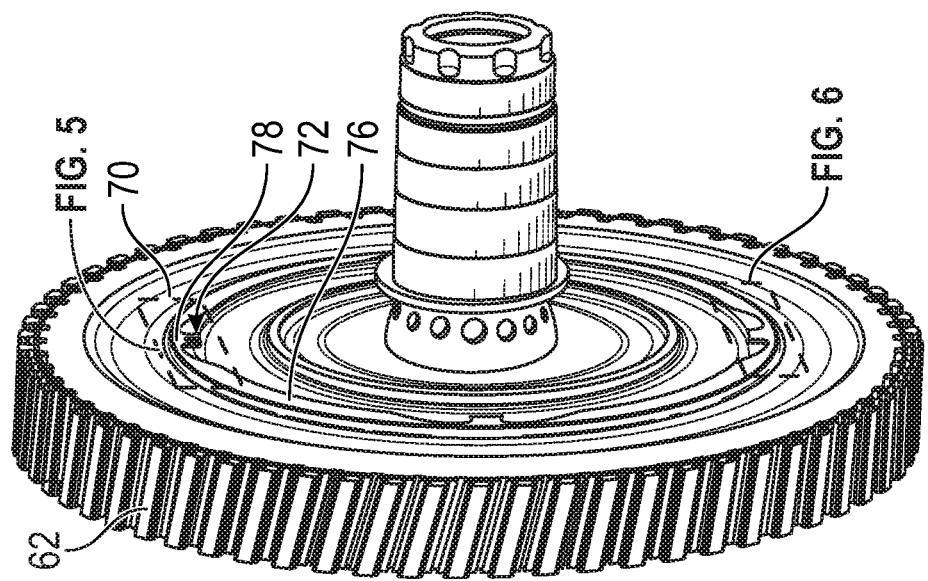
FIG. 4 is a perspective view of an aft rotor stage of the power turbine section.

Referring now to FIGS. 4-6, the aft rotor stage 62 includes multiple structural features on an aft side 70 of the aft rotor stage 62 that are configured to counteract the assembly and disassembly torque applied to the locknut 68, as described herein. The aft rotor stage 62 includes a circumferential cutout 72 that is used to hold a balance ring (not shown) of the rotor assembly in a radial direction. In order to retain the ring in the circumferential direction, there is a recessed portion 74 of a flange 76 that at least partially defines the circumferential cutout 72. A first tab 78 extends radially inward within the recessed portion 74 and includes a radial slot 80 which holds an anti-rotation feature of the balance ring.

The first tab 78 includes a first tab side 82 and a second tab side 84 on each circumferential side of the first tab 78. In addition to the first tab 78, a second tab 86 is provided at a circumferential location spaced from the first tab 78. The second tab 86 also includes a first tab side 88 and a second tab side 90 one each circumferential side of the second tab 86. The first and second tabs 78, 86 are features that resist assembly and disassembly torques during tightening or loosening of the locknut 68 on the power shaft 30. As shown, the second tab 86 does not require a radial slot, such as radial slot 80 of the first tab 78, since the circumferential position of the balance ring is maintained within the circumferential cutout 72 with a single retention location.

In the illustrated embodiment of FIG. 4, four torque resistance features are illustrated, specifically one first tab 78 and three second tabs 86. However, it is to be appreciated that the illustrated embodiment is merely an example of the number of torque resistance features (i.e., first and second tabs 78, 86) that may be included. For example, it is contemplated that the number of torque resistance features may range from 2 to 8. Additionally, the circumferential spacing between the torque resistance features may vary from the illustrated embodiment. In the illustrated example, the torque resistance features are equally spaced (i.e., 90 degree spacing), but it is contemplated that the spacing may be non-equidistant.

Figure 8:
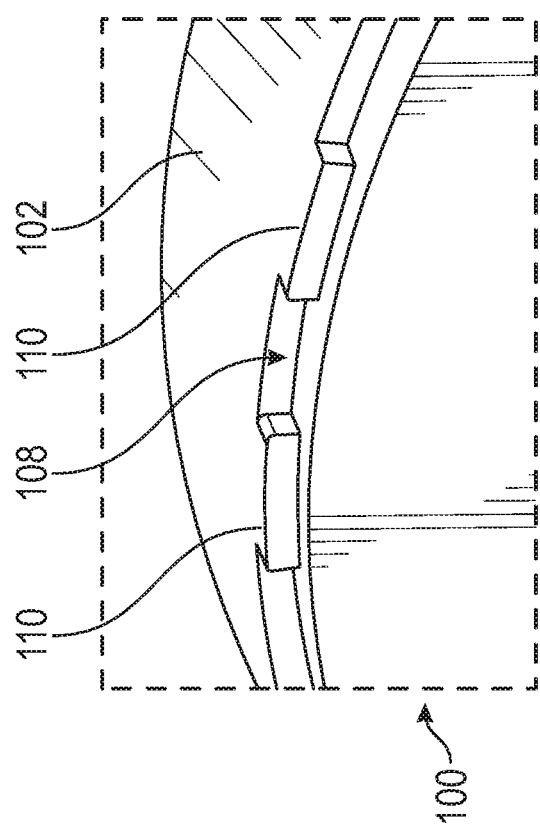
FIG. 8 is an enlarged view of section VIII of FIG. 7 illustrating a slot profile of the tooling fixture.
Figure 7:
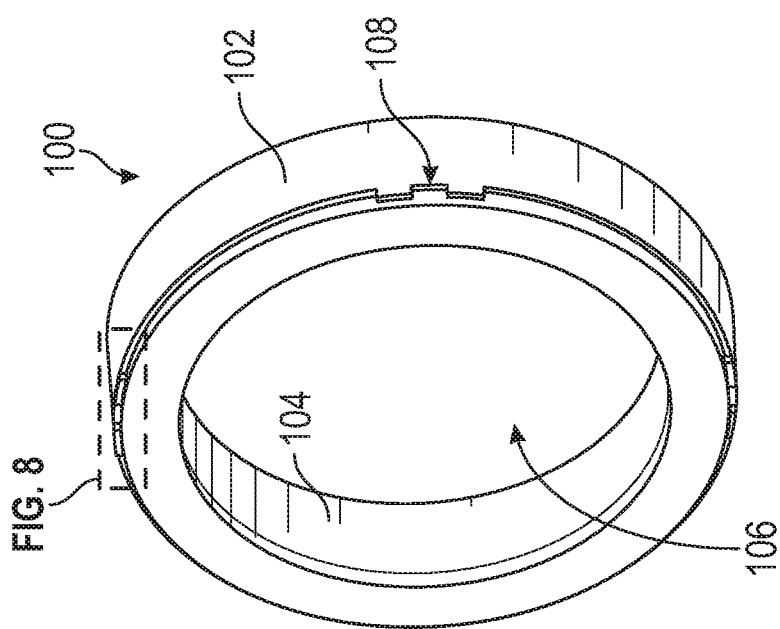
FIG. 7 is a perspective view of a tooling fixture engageable with the aft rotor stage.

Referring now to FIGS. 7 and 8, a tooling fixture 100 that is engageable with the aft rotor stage 62 is illustrated. In particular, the tooling fixture 100 is engageable with the aft side 70 of the aft rotor stage 62 during assembly or disassembly of the locknut 68 with the power shaft 30. The tooling fixture 100 is an annular member that includes a radially outer surface 102 and a radially inner surface 104. The radially inner surface 104 defines a central aperture 106 that is large enough to ensure sufficient clearance with the power shaft 30 and the locknut 68. The tooling fixture 100 includes a plurality of slots 108 proximate the radially outer surface 102. Each of the slots 108 is formed by a pair of axially extending protrusions 110. As described in detail above in connection with the number and position of the torque resistance features (i.e., first and second tabs 78, 86), the number and position of the slots 108 may vary from that illustrated. The number and position of the slots 108 corresponds to the number and position of the tabs 78, 86. Each of the slots 108 engage with the first tab side 82 or 88 and the second tab side 84 or 90 of the first tab 78 and second tab 86, respectively. The diameter of the position of the slots 108 on the tooling fixture 100 is significantly greater than the amount of radial engagement between the tooling fixture 100 and the tabs 78, 86, thereby ensuring that the shear and bearing stresses on both the tabs 78, 86 and the tooling fixture are lower than the material's yield strength. In some embodiments, the ratio of the diameter to the radial engagement distance is greater than 100, but this ratio may vary depending upon the particular application and the particular materials.

The embodiments described herein ensure that the power turbine rotor assembly is supported in the circumferential direction during assembly and disassembly of the locknut 68 on the power shaft 30, even for relatively small diameter rotor shafts.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power turbine rotor locking assembly comprising:
   a rotor shaft;
   an aft rotor stage surrounding the rotor shaft;
   a locknut torqued to the rotor shaft;
   a plurality of torque resistance features located on an aft side of the aft rotor stage, the plurality of torque resistance features radially extending from the aft side of the aft rotor stage, each of the plurality of torque resistance features defined as a tab extending from a tab base to a tab distal end, the tab distal end disposed radially inboard of the tab base; and
   a tooling fixture having a plurality of corresponding torque resistance features, the corresponding torque resistance features selectively engageable with the plurality of torque resistance features of the aft rotor stage to resist circumferential movement during assembly and disassembly of the locknut with the rotor shaft, the plurality of corresponding torque resistance features axially extending from the tooling fixture.

2. The power turbine rotor locking assembly of claim 1, wherein the tab having a first circumferential side and a second circumferential side, wherein each of the plurality of corresponding torque resistance features is a slot.

3. The power turbine rotor locking assembly of claim 1, wherein the number of the plurality of torque resistance features ranges from two (2) to eight (8).

4. The power turbine rotor locking assembly of claim 1, wherein the plurality of torque resistance features are circumferentially spaced from each other in an equidistant arrangement.

5. The power turbine rotor locking assembly of claim 1, wherein the tooling fixture is an annular member having a radially outer surface and a radially inner surface, the radially inner surface defining a central aperture having a diameter greater than a diameter of the locknut and the rotor shaft.

6. The power turbine rotor locking assembly of claim 5, wherein the plurality of corresponding torque resistance features are located proximate the radially outer surface of the tooling fixture.

* * * * *